(12) United States Patent
Velagapudi et al.

(10) Patent No.: US 11,640,556 B2
(45) Date of Patent: May 2, 2023

(54) RAPID ADJUSTMENT EVALUATION FOR SLOW-SCORING MACHINE LEARNING MODELS

(71) Applicant: Microsoft Technology Licensing, LLC

(72) Inventors: Nishant Velagapudi, Seattle, WA (US); Zhengwen Zhu, Redmond, WA (US); Venkatasatya Premnath Ayyalasomayajula, Issaquah, WA (US); Rajkumar Ramasamy, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 527 days.

(21) Appl. No.: 16/775,112

(22) Filed: Jan. 28, 2020

(65) Prior Publication Data

US 2021/0232980 A1 Jul. 29, 2021

(51) Int. Cl.
*G06N 20/20* (2019.01)
*G06K 9/62* (2022.01)
*G06V 10/75* (2022.01)

(52) U.S. Cl.
CPC ............ *G06N 20/20* (2019.01); *G06K 9/623* (2013.01); *G06K 9/6262* (2013.01); *G06V 10/757* (2022.01)

(58) Field of Classification Search
None
See application file for complete search history.

(56) References Cited

U.S. PATENT DOCUMENTS

| | | | |
|---|---|---|---|
| 7,092,922 B2 | 8/2006 | Meng et al. | |
| 8,190,537 B1* | 5/2012 | Singh | G06N 20/00 706/12 |
| 11,102,304 B1* | 8/2021 | Jain | H04L 67/63 |
| 11,215,980 B2* | 1/2022 | Cella | G16Z 99/00 |
| 2015/0170053 A1 | 6/2015 | Miao | |

(Continued)

OTHER PUBLICATIONS

Raschka, Sebastian, "Model Evaluation, Model Selection, and Algorithm Selection in Machine Learning", In Journal of Computing Research Repository, Nov. 10, 2018, pp. 1-49.

(Continued)

*Primary Examiner* — Anand P Bhatnagar
(74) *Attorney, Agent, or Firm* — NovoTechIP International PLLC

(57) ABSTRACT

Techniques performed by a data processing system for analyzing the impact of training data changes on a machine learning model herein include training a first instance of a machine learning model with a first set of training data; modifying the first set of training data to produce a second set of training data; training a second instance of the model with the second set of training data; comparing the first instance of the model to the second instance of the model to determine features that differ between the first instance and the second instance of the model; identifying a subset of historical data associated with the features that differ between the first instance and the second instance of the model; and scoring the subset of the historical data to produce a report identifying differences in the output of the first instance and the second instance of the machine learning model.

20 Claims, 12 Drawing Sheets

(56) References Cited

U.S. PATENT DOCUMENTS

| | | |
|---|---|---|
| 2016/0055426 A1* | 2/2016 | Aminzadeh ............ G06N 20/00 |
| | | 706/12 |
| 2016/0110657 A1 | 4/2016 | Gibiansky et al. |
| 2016/0300156 A1 | 10/2016 | Bowers et al. |
| 2016/0358099 A1 | 12/2016 | Sturlaugson et al. |
| 2019/0026654 A1* | 1/2019 | Allen ..................... G06N 20/00 |
| 2019/0147350 A1 | 5/2019 | Bai et al. |
| 2021/0232980 A1* | 7/2021 | Velagapudi ............ G06K 9/623 |
| 2021/0279618 A1* | 9/2021 | Wang ..................... G06N 20/00 |
| 2021/0334950 A1* | 10/2021 | Long ........................ G06N 3/04 |
| 2022/0092478 A1* | 3/2022 | Mishra ..................... G06N 3/08 |
| 2022/0164704 A1* | 5/2022 | Sugiura ................ G06K 9/6298 |
| 2022/0222743 A1* | 7/2022 | Dital ..................... G06Q 40/10 |

OTHER PUBLICATIONS

"International Search Report and Written Opinion Issued in PCT Application No. PCT/US2020/065171", dated May 10, 2021, 12 Pages.

* cited by examiner

Feature Weight Changes

| 305 | 310 Feature | 315 Old Model Weights | 320 Updated Model Weights | 325 Delta | 330 Delta Magnitude |
|---|---|---|---|---|---|
| 2580 | vat | 0.253671 | 0.000000 | -0.253671 | 0.253671 |
| 467 | bill | 0.129672 | 0.218042 | 0.088370 | 0.088370 |
| 1826 | number | 0.034058 | 0.001767 | -0.032291 | 0.032291 |
| 1547 | locat | 0.010500 | 0.041231 | 0.030731 | 0.030731 |
| 2788 | understand | 0.026413 | 0.054130 | 0.027717 | 0.027717 |
| ⋮ | | | | | |
| 1090 | familiar | 0.000000 | 0.000000 | 0.000000 | 0.000000 |
| 1091 | far | 0.000000 | 0.000000 | 0.000000 | 0.000000 |
| 1092 | farm | 0.000000 | 0.000000 | 0.000000 | 0.000000 |
| 1093 | fast | 0.000000 | 0.000000 | 0.000000 | 0.000000 |
| 2995 | zone | 0.000000 | 0.000000 | 0.000000 | 0.000000 |

Generate Report 340     Cancel 345

FIG. 3

Using Weights to Sample Intelligently

| | Feature | Delta Magnitude |
|---|---|---|
| 2580 | vat | 0.253671 |
| 467 | bill | 0.088370 |
| 1826 | number | 0.032291 |
| 1547 | locat | 0.030731 |
| 2788 | understand | 0.027717 |
| ... | ... | ... |
| 1090 | familiar | 0.000000 |
| 1091 | far | 0.000000 |
| 1092 | farm | 0.000000 |
| 1093 | fast | 0.000000 |
| 2995 | zone | 0.000000 |

Construct Query ⇒ select top 750 * from [TableName]
WHERE CONTAINS ([TextField], 'bill') OR
CONTAINS ([TextField], 'locat') OR
CONTAINS ([TextField], 'number') OR
CONTAINS ([TextField], 'receipt') OR
CONTAINS ([TextField], 'understand') OR
CONTAINS ([TextField], 'vat')

FIG. 4

Changes to Model Resulting from Changes to Training Data

Samples Lost from Class 1500005 — 505

| Input Text | Old Class | New Class |
|---|---|---|
| good no vat show invoic specifi vat id settin... | 1500005 | 1500018 |
| problem introduc vat section facturaicon | 1500005 | 1500034 |
| Cant enter vat bill time mislead crucial there... | 1500005 | 1500034 |

Samples Gained into Class 1500005 — 510

| Input Text | Old Class | New Class |
|---|---|---|
| new admin account understand product avail... | 9000093 | 1500005 |
| receiv bill notif not understand | 1200012 | 1500005 |
| question regard bill see invoice portal not rec... | 3100010 | 1500005 |

Print Report 515 | Retrain Model 520 | Retrain Model 520 | Cancel 525

FIG. 5

Feature Weight Changes

| Feature | Old Weight | New Weight | Delta | Delta Magnitude | |
|---|---|---|---|---|---|
| Seats_11-25 | 0.48 | 0.34 | 0.13994 | 0.1399 | ☐ |
| Age_60-90 | 0.12 | 0.25 | -0.1263 | 0.1263 | ☑ |
| E5_Customer | 0.12 | 0.24 | -0.1166 | 0.1166 | ☑ |
| Seats_1-10 | 0.24 | 0.33 | -0.0923 | 0.0923 | ☑ |
| E3_Customer | 0.23 | 0.14 | 0.08833 | 0.0883 | ☑ |
| Age_30-60 | 0.18 | 0.23 | -0.0561 | 0.0561 | ☑ |
| BusinessPremium_Customer | 0.31 | 0.31 | 0 | 0 | ☐ |
| Age_90-180 | 0.48 | 0.48 | 0 | 0 | ☐ |

Generate Report 1140   Cancel 1145

FIG. 11

Using Weights to Sample Intelligently

| Feature | Delta Magnitude |
|---|---|
| Seats_11-25 | 0.1399 |
| Age_60-90 | 0.1263 |
| E5_Customer | 0.1166 |
| Seats_1-10 | 0.0923 |
| E3_Customer | 0.0883 |
| Age_30-60 | 0.0561 |
| BusinessPremium_Customer | 0 |
| Age_90-180 | 0 |

Construct Query

SELECT * from [TableName]
WHERE Age BETWEEN 60 AND 91
OR CONTAINS([TenantLicense], 'E5')
OR Seats BETWEEN 11 and 26

RAPID ADJUSTMENT EVALUATION FOR SLOW-SCORING MACHINE LEARNING MODELS

BACKGROUND

After training a machine learning (ML) model and putting the model into production, adjustments are often required. While fine-tuning model performance can be done in a number of ways, one of the most easily understood manipulations is the addition or removal of training data. After a model change, the question becomes how to ensure that the performance has been corrected. The conventional approach is to score historical records using the new model and compare old and new model results over the old data. Highlighting the difference between the two in past records will highlight where the models diverge in practice.

This approach leads to resource issues when the models in question are more complex. For example, ensemble-based techniques, such as Random Forests, can score between one and two orders of magnitude slower than Linear Regression. Depending on type of the problem addressed by the model and volume of input, scoring enough historical data to comprehensively highlight points of divergence between two models will become cumbersome. This loss of agility subsequently hinders analysis efforts. If it takes hours to determine if a small alteration to training data will bring about the desired effect, stakeholders will be less likely to engage in fine-tuning efforts. Thus, there are significant areas for new and approved mechanisms for fine-tuning machine learning models.

SUMMARY

An example data processing system according to the disclosure may include a processor and a computer-readable medium storing executable instructions. The executable instructions include instructions configured to cause the processor to perform the operations of training a first instance of a machine learning model with a first set of training data; modifying the first set of training data to remove one or more data elements, add one or more data elements, or both to produce a second set of training data; training a second instance of the machine learning model with the second set of training data; comparing the first instance of the machine learning model to the second instance of the machine learning model to determine features that differ between the first instance of the machine learning model and the second instance of the machine learning model; identifying a subset of historical data associated with the features that differ between the first instance of the machine learning model and the second instance of the machine learning model; and scoring the subset of the historical data to produce a report identifying differences in the output of the first instance of the machine learning model and the second instance of the machine learning model.

An example method for performed by a data processing system for evaluating training data changes on a machine learning model includes: training a first instance of the machine learning model with a first set of training data; modifying the first set of training data to remove one or more data elements, add one or more data elements, or both to produce a second set of training data; training a second instance of the machine learning model with the second set of training data; comparing the first instance of the machine learning model to the second instance of the machine learning model to determine features that differ between the first instance of the machine learning model and the second instance of the machine learning model; identifying a subset of historical data associated with the features that differ between the first instance of the machine learning model and the second instance of the machine learning model; and scoring the subset of the historical data to produce a report identifying differences in the output of the first instance of the machine learning model and the second instance of the machine learning model.

An example memory device according to the disclosure stores instructions that, when executed on a processor of a data processing system, cause the data processing system to evaluate training data changes on a machine learning model, by: training a first instance of the machine learning model with a first set of training data; modifying the first set of training data to remove one or more data elements, add one or more data elements, or both to produce a second set of training data; training a second instance of the machine learning model with the second set of training data; comparing the first instance of the machine learning model to the second instance of the machine learning model to determine features that differ between the first instance of the machine learning model and the second instance of the machine learning model; identifying a subset of historical data associated with the features that differ between the first instance of the machine learning model and the second instance of the machine learning model; and scoring the subset of the historical data to produce a report identifying differences in the output of the first instance of the machine learning model and the second instance of the machine learning model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 illustrates another example of a user interface of the training data management application that may be rendered on a display of a data processing system.

FIG. 4 is a diagram illustrating a process for formulating a query to select relevant historical data to be rescored based on the changes to the machine learning model.

FIG. 5 illustrates another example of a user interface of the training data management application that may be rendered on a display of a data processing system.

FIG. 11 illustrates an example user interface that is similar to the user interface illustrated in FIG. 3.

DETAILED DESCRIPTION

Figure 1:
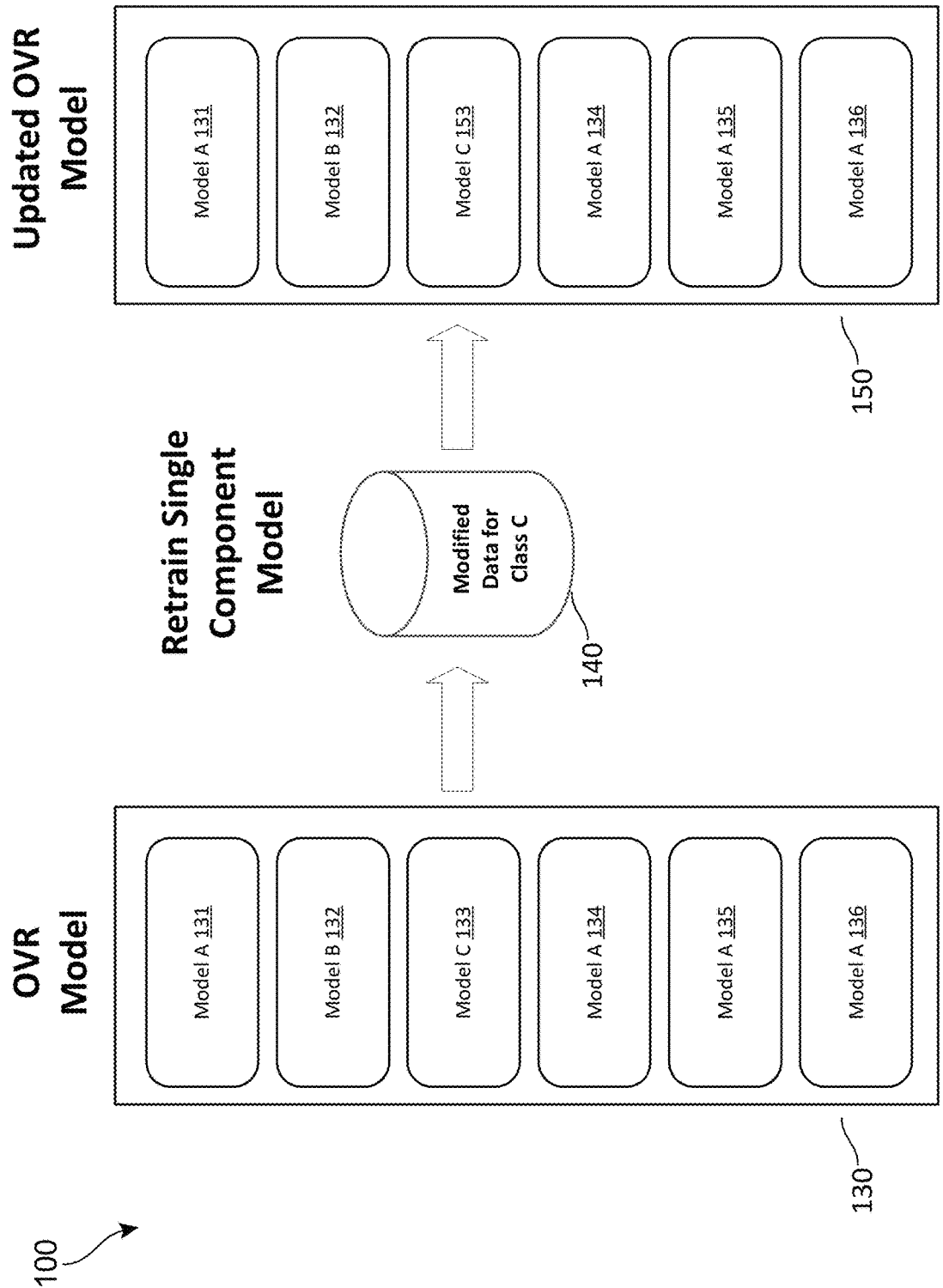
FIG. 1 is a block diagram illustrating an example of a computing environment in which an example machine learning model has been implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for fine-tuning machine learning models are provided. Conventional approaches for fine-tuning machine learning models require a significant investment in time and processing power to score the extensive amount of historical data used to validate the behavior of the model. As a result, fine-tuning of the model may not be undertaken often enough and the output of the model may deviate from expected behavior. The techniques disclosed herein solve these technical problems by providing means for rapidly determining the impact of changes to training data on machine learning models. An updated instance of the machine learning model may be trained on modified training data and the output of the original model and the modified model compared to highlight where the instances of the model diverge.

The technical solution disclosed herein identifies training data that is relevant to proposed changes to the machine learning model and provides only the relevant data to the modified instance of the model for scoring rather than then entire corpus of historical data. A technical benefit of this solution is that the time required to determine whether a change to the training data of a machine learning model has a desired impact on the output of the model may be significantly reduced. The relevant historical data can be identified by examining differences in the feature weights and/or other internal parameters of the original instance of the machine learning model and the modified instance of the model. The magnitude of these differences may be indicative of the likelihood of the output associated with these features differing in the original instance of the model and the modified instance of the model. The historical data may be filtered to restrict the historical data to subset that is mostly likely to be relevant to the changes in the output of the machine learning model. The subset of the historical data may be rescored using the modified version of the machine learning model, and a report may be generated that highlights changes in the output of the machine learning model processing the subset of the historical data. The size of the subset of the historical data may be significantly smaller than the entire set of historical data used to validate the behavior of the machine learning model, because the subset of the historical data is limited only to data expected to be relevant based on the changes to the feature weights or other internal parameters of the model. A report may be generated that highlights differences between output of the original instance of the model and the modified instance of the model. A user can quickly evaluate whether the changes to the training data produced expected behavior in the machine learning model. These techniques can significantly reduce the time required to fine-tune a machine learning model from hours or days to a matter of seconds.

FIG. 1 is a block diagram illustrating an example of a computing environment 100 in which an example machine learning model has been implemented. In the example illustrated in FIG. 1, the machine learning model is configured to perform text classification. Text classification is a process whereby tags or categories are assigned to text based on the contents of the text. Text classification is used in a wide variety of applications, such as but not limited to sentiment analysis, intent analysis, topic labeling, and spam detection. While the example implementations discussed herein are focused on text classification to illustrate the concepts of the techniques disclosed herein, these techniques are not limited to text classification machine learning models.

Text classification machine learning models may be extremely complex, and full model retraining can take a prohibitively long period of time for testing whether small changes to fine-tune the model provide desired results. Consider the Alchemy text classification platform, which scores hundreds of thousands of text inputs each month. Fine-tuning the machine learning model used for text classification requires a significant investment of time. Full model retraining after making an update to the machine learning model may take forty minutes or longer, and the updated model may need to analyze and score nearly a month's worth of text before it may be possible to whether the adjustments to the machine learning model had the desired effect. These numbers are merely estimates that illustrate the significant time commitment involved in determining whether an adjustment to a machine learning model actually provides a desired effect.

An administrator of a text classification model, such as that illustrated in FIG. 1, may determine that certain text inputs are being misclassified by the model. In a conventional system, the machine learning model would need to be put through a time-consuming retraining and verification process as described here. Thus, analysis efforts are often minimal, and changes are often made without sufficient oversight because the training cadences are too slow for traditional interactive work. The techniques can provide a greatly improved and interactive experience in which a user can quickly determine whether proposed changes to the model would have a desired effect on the model's output without having to wait for an extensive retraining and verification process to be completed.

To illustrate these concepts, FIG. 1 illustrates a One-vs.-Rest (OVR) model that includes one classifier per output represented by models 131, 132, 133, 134, 135, and 136. OVR models make predictions of the likelihood of each output class independently. The OVR model then suggests the most likely output from these predictions as the model's overall output.

OVR model 130 represents a first state of the OVR model. In this example, assume that the classifier associated with output C is not providing good outputs. To address this problem, the classifier associated with output C may be retrained with modified training data 140 without modifying the rest of the OVR wrapper. A significant amount of time and processing resources may be saved by only having to retrain a single classifier model within the OVR model.

The model 130 may include a large set of training data that includes training data for each of the models 131, 132, 133, 134, 135, and 136. Each classifier in the OVR model is trained with a set of positive examples similar to the data to be classified within that class and a set of negative examples that includes dissimilar data belonging to other classes. The techniques disclosed herein can be used to identify training data that is associated with model 133 which is the classifier for class C in this example. How this training data may be identified will be discussed in greater detail in the examples that follow. The modified training data 140, which includes the training data associated with the class C classifier may be used to retrain classifier model 133 of the OVR model 130 to produce the modified OVR model 150 which represents a second state of the OVR model. The retraining results in a modified model 153 for the class C classifier that has been retrained according to the modified training data 140. The rest of the classifiers have not been modified. By selectively modifying training data associated only with the problematic classifier, the amount of data involved in the retraining may be greatly reduced.

While the example implementation illustrated in FIG. 1 and referred to in the examples that follow refer to a text classifier and an OVR model, the techniques disclosed herein are not limited to these specific example implementations. These techniques may be used with other types of machine learning models to identify changes in the model resulting from changes to the training data provided to the model. Furthermore, the models are not limited to text classifiers. These techniques may be applied to machine learning models may be trained to make other type of predictions or decisions.

FIGS. 2-5 illustrate a series of example user interfaces and processes that may be performed by an example training data management application 605 illustrated in FIG. 6, which will be described in detail below. The training data management application may be implemented on various types of data processing system, such as but not limited to a server computer, a client computer, a personal computer, a tablet computer, or a laptop computer. The data processing system may be implemented by example software architecture 800 of FIG. 8 and/or the example computing device 900 illustrated in FIG. 9.

Figure 2:
FIG. 2 illustrates an example user interface of a training data management application that may be rendered on a display of a data processing system.

FIG. 2 illustrates an example user interface 200 that may be rendered on a display of a data processing system, such as computing device 900, by the training data management application 605. The training data management application 605 may be an application installed and executed locally on the data processing system of the user and may be implemented by the training data management application 605 illustrated in FIG. 6.

An analyst or other user who would like to tune the performance of a machine learning model can use the training data management application 605 to make changes to training data and to quickly identify and rescore historical data that is relevant to the proposed change(s) to the machine learning model to determine whether the proposed changes to the training data produce expected results. Thus, rather than scoring a large amount of historical data using a complex model, the techniques disclosed herein instead compare new and old model weights to identify the features that would be most impacted by the change to the training data. In the examples that follow, the impacted feature information can be used to generate a set of filters that restrict the historical data to only include examples that are likely to be relevant to the proposed change(s) to the machine learning model. As will be discussed in the examples that follow, only the relevant examples will be rescored to produce a report on historical data that is newly classified or lost from a particular class due to the proposed changes to the model. Thus, the approach provides technical solution to the problems associated with fine-tuning machine learning models that by identifying training data that is relevant to proposed changes to the machine learning model and provides only the relevant data to the modified instance of the model for scoring rather than then entire corpus of historical data. A technical benefit of this solution is that the time required to determine whether a change to the training data of a machine learning model has a desired impact on the output of the model may be significantly reduced.

The user interface 200 of the training data management application 605 provides means for a user to search for historical data by class and to update the historical data associated with the class to be included in the training data used to train the machine learning model. The user interface 200 includes a search field 205 in which a user may enter class identifier, class description, or other information that may be used to identify the class. The user interface 200 may implemented as part of a training data management application 605 implemented locally on the data processing system of the user or may be an interface to a cloud-based implementation of the application for managing training data for machine learning models. In some implementations, the user interface may include user interface component(s) suitable for specifying or selecting a location in memory of the data processing system or a network location where historical data and/or training data for the machine learning model is located.

Once the class for which the training data is to be managed has been identified, the training data management application 605 may update the user interface 200 to display a list of training data that is currently associated with class 210 and a list of training data that is available to be associated with the class 215. The user interface 200 may permit the user to select entries to be removed from the list of training data currently associated with the class 210 by clicking on the checkbox next to each entry to be removed. The user interface 200 may permit the user to select entries from the list of training data that is available to be associated with the class 215 to add to the training data by clicking on the checkbox next to the entries to be added to the training data. The user may click the save changes button 220 to cause the training data management application to update the training data set by removing and/or adding the selected data elements to the training data. The user may click the cancel button 225 to cancel the selections that they have made and to not save any updates to the training data. The cancel button may also clear the data that has been loaded on the form.

The user interface 200 illustrated in FIG. 2 is just an example that illustrates the concepts disclosed herein and does not limit these techniques to this specific user interface. One of skill in the art will recognize that other types of user interface components, such as checkboxes, list boxes, toggles, and/or other types of user interfaces components may be utilized to select data to be added and/or removed from the training data associated with the class.

The user interface 200 may cause the training data management application 605 to perform one or more actions responsive to the user clicking the apply changes button 220. The training data management application 605 may prompt the user whether to save the changes to the training data to a new training dataset or to overwrite the existing training dataset. The user may wish to save the training data to a new dataset when testing out changes so that they may revert to previous dataset if the changes that they have made do not provide improved performance.

The training data management application 605 may instantiate a new instance of the machine learning model and train that instance of the machine learning model with the modified training data set. The training data management application 605 can compare the feature weights, coefficients, and/or other internal parameters of the original instance of the machine learning model with those of the modified instances of the machine learning model to highlight potential differences in the output of the two instances of the model. The feature weights, coefficients, and/or other internal parameters of the instances of the models provide a numerical representation of how the instance of the model is expected to behave. For example, the features weights associated with an instance of a text classifier are indicative of how the model may distinguish whether a textual input belongs to a particular class or to another class.

In some implementations, the modifications to the training data may be made offline outside of the training data management application 605. The training data may be modified by manually editing training data in a text editor, in a database management tool, via scripts, or other means. The user interface 200 may include a means for loading such modified training data instead of or in addition to the interface described above for modifying the training data.

FIG. 3 illustrates an example user interface 300 that may be rendered on a display of the data processing system of the user by the training data management application 605. User interface 300 includes a table that lists feature weight changes resulting from the modifications made to the text classifier training data in the user interface 200 of FIG. 2. An instance of the model may be retrained based on the training data changes provided, and the feature weights associated with the original instance of the model and the modified instance of the model may be compared to determine an impact of the proposed changes to the training data on the behavior of the model. The training data management application 605 may display user interface 300 in response to the user clicking the apply changes button 200 on user interface 200 illustrated in FIG. 2.

The user interface 300 may include a feature identifier column 305, a feature column 310, an old model weights column 315, an updated model weights column 320, a delta column 325, a delta column 330, and a select entry column 335. The value in the feature identifier column 310 represents a unique identifier assigned to the feature. The feature identifier may be a numerical value assigned to the feature by the algorithms used to train the machine learning model. The value in the feature column 310 represents the feature for which the weights have changed as a result of the changes to the training data. In the example illustrated in FIGS. 2 and 3, the model is a text classifier, so the features are text strings. However, the techniques disclosed herein are not limited to text classifiers, and in other implementations, the features may be other types of data.

The old model weights column 315 illustrates what feature weight was assigned to the feature based on the original training data. The updated model weights 320 column illustrates what the model weight for the feature would be if the training data were modified to include the changes made via the user interface 200. The delta column 325 illustrates the difference between the updated model weight 320 and the old model weight 315. The delta magnitude column 330 illustrates the absolute value of the delta value 325. In the example illustrated in FIG. 3, the entries in the list are sorted based on the magnitude from largest to smallest. The greater the magnitude, the greater the change in the feature weight of that feature resulting from the modifications to the training data. The user interface 300 may display the greatest magnitude changes higher in the list to provide users with a means for quickly identifying the impact of the changes to the model responsive to modifications to the training data for the machine learning model. The features having the highest magnitude changes are features that are mostly likely to be impacted by the changes to the training data. For example, in the text classifier example discussed with regard to FIGS. 2 and 3, a feature having a higher magnitude change in feature weight in the modified model indicates that historical data that includes that feature is more likely to be reclassified into a new class than data associated with features having a small magnitude change in feature weight. Therefore, historical data associated with these features should be selected for rescoring by the modified instance of the machine learning model to determine whether the behavior of the modified instance of the machine learning model is as expected.

In the example illustrated in FIG. 3, the table of the user interface 300 reflects the proposed changes to model C (class 1500005) in this example. In this example, the word "vat" has the greatest magnitude change and the magnitude is negative indicating that the importance of this word has decreased in predicting the output of the classifier of model C. In contrast, the importance of the words "bill," "number," "locat," and "understand" have a positive magnitude indicating that they are more important to predicting the class in the modified instance of the machine learning model.

The select entry column 335 includes a checkbox that allows the user to select that entry for additional processing. In some implementations, the select entry column 335 may be checked by default for magnitudes that are non-zero or over a predetermined threshold. The user may click on the generate report button 340 to cause the application to determine, using the process described with respect to FIG. 4, a report illustrating changes to the model resulting from the changes to the training data. An example of such a report is illustrated in FIG. 5. The user may select an entry for inclusion in the report by checking the checkbox corresponding to the entry in the column 335 (if not already checked) or may exclude an entry from the report by unchecking the checkbox. The training data management application keeps track of which features were selected by the user on user interface 300 for subsequent processing as discussed with respect to FIGS. 4 and 5. The user may cancel the process by clicking on the cancel button 345.

In some implementations, entries having over a threshold delta magnitude value may be selected by default. The threshold value may be configurable and may vary based on the type of machine learning model being fine-tuned using the application. The user may override the default value and select or deselected features to be processed further. Furthermore, in some implementations, all features having a delta magnitude greater than zero may be selected by default and the user may deselect features that they do not wish to include. The selected features may then be used to formulate a query for relevant historical data that may be scored by the modified instance of the machine learning model.

FIG. 4 is a diagram illustrating a process for formulating a query to select relevant historical data to be rescored based on the changes to the machine learning model. The process illustrated in FIG. 4 may performed by the training data management application 605. The process illustrated in FIG. 4 may begin with feature data being selected in user interface 300 being used to formulate the query for relevant historical data. The data may be stored in a database, datastore, or other searchable means for storing the data. In the example illustrated in FIG. 4, the historical data is for a text classifier, and is optimized for full text searching to provide faster reporting of the impact of the selected changes to the training data. The type of storage and the structure and/or organization of the storage may be optimized for the type of machine learning model and the type of data utilized by that model.

In the example illustrated in FIG. 4, a Structured Query Language (SQL) query is constructed that includes the features that were selected via user interface 300 of FIG. 3. The database in this example is optimized to include a full text index to facilitate faster retrieval of relevant historical data records. The number of records returned by the query may be limited by a configurable parameter. The user may modify the number of samples queried and the maximum number of historical records retrieved to suit the particular needs of the user. Users requiring faster results can select fewer features. The balance between speed and sample size depends upon the needs of the particular user. These techniques can significantly boost the analytical agility within the machine learning platform significantly.

The subset of the historical data selected by the query may be provided as an input to the modified instance of the machine learning model. The modified instance of the machine learning model can score the historical data, and the output from the modified instance of the machine learning model can be compared to the output of the original instance of the machine learning model to identify changes to the behavior of the model. The output produced by original instance of the model may be stored in a database or other data store and be retrieved for comparison with the output of the modified instance of the machine learning model. In other implementations, the subset of the training data may be provided as an input to both the original instance of the machine learning model and the modified instance of the machine learning model to obtain the outputs of both instances. The user interface illustrated in FIG. 5 can be used to present the differences in the behavior of the original instance and the modified instance of the model to a user.

FIG. 5 illustrates an example user interface 500 that may be rendered on a display of the data processing system of the user by the training data management application 605. The user interface 500 presents changes to the machine learning model resulting from changes to the training data. The user interface 500 allows the user to quickly see how the changes to the training data via the user interface 200 or such means have impacted the scoring of the historical data used to test the changes to the machine learning model. In the example illustrated in FIG. 5, the machine learning model is a text classifier, and the user interface 500 illustrates a list of samples from the historical data were lost from the class and gained from the class as a result of the modifications to the training data of the machine learning model. The user interface 500 can be configured to support other types of machine learning models in addition to or instead of text classifiers and may be configured to display changes in the scoring between the original and modified version of the machine learning model.

The user interface 500 displays two tables of data in this example implementation. The first table 505 includes samples from the historical data that were lost from the class 1500005 due to the changes to the model implemented in the preceding examples. The table 505 includes the input text associated with each of the samples that were lost from 1500005 due to the changes made to the training data as well as the new class into which the samples were classified. The user interface 500 also includes a second table 510 that includes samples from the historical data that were gained by the class 1500005 due to the changes to the training data. The table 510 includes the input text associated with each of the samples, the old class with which the samples were associated, and the new class with which the samples are associated.

The training data management application may generate a report that may be printed or saved on data processing system in response to the print report button 515 being clicked or otherwise activated. The training data management application 605 may return to the user interface 200 to allow the user to make additional changes to the training data or to revert changes that were previously made to the training data if the changes to scoring of the historical data illustrated on the user interface 500 demonstrate that the machine learning model requires additional fine tuning. The training data management application may save the updates to the model in response to the save model button 525 being clicked or otherwise activated. The save model button may permit the user to save a copy of the modified model that may be deployed to a production environment in which the model is utilized for actual work. The save model button may store a copy of the machine learning model in a version control management system with a copy of the training data that is used to generate that version of the machine learning model. This approach allows the user to maintain multiple versions of the machine learning model and to switch between different versions of the model for additional testing and refinement of the machine learning model. The training data management system may discard the changes to the machine learning model responsive the cancel button 530 being selected and may return to the user interface 200.

Figure 10:
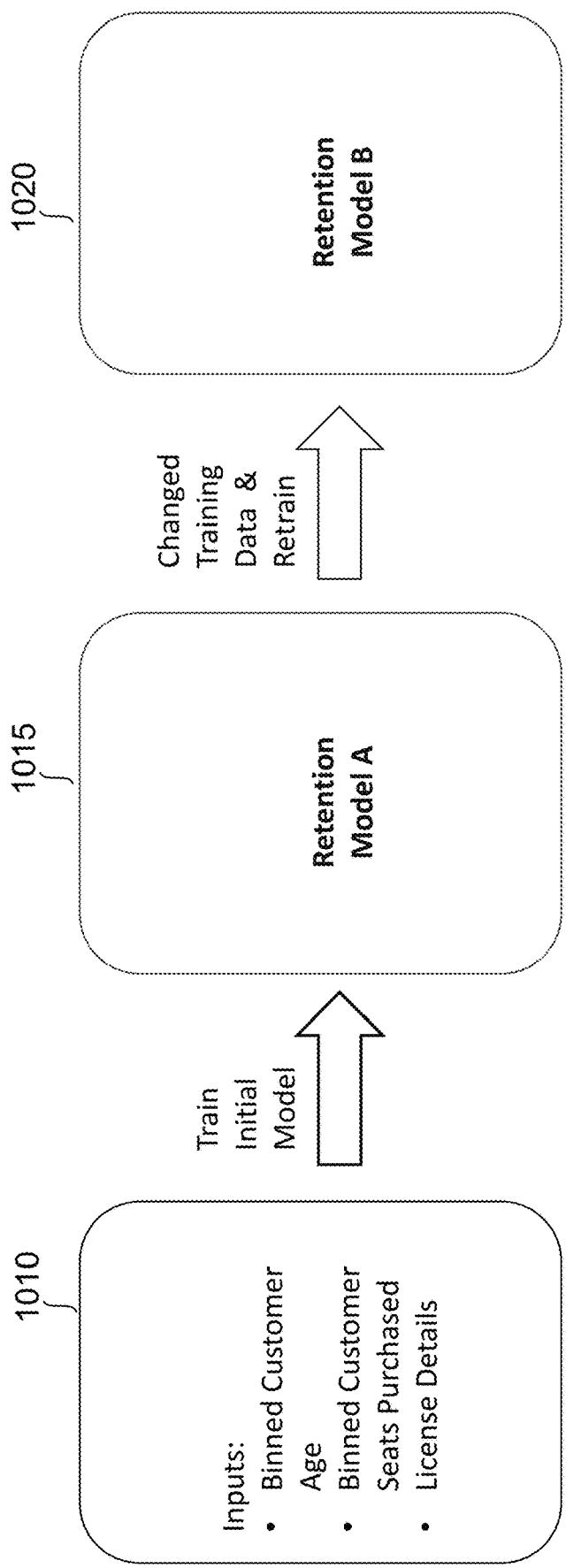
FIG. 10 is an example of the techniques disclosed herein applied to a binary classifier model.

FIG. 10 is an example of the techniques disclosed herein applied to a binary classifier model. The binary classifier in the examples is trained to predict the likelihood of customer discontinuing a service to which the customer is subscribed. The customer database may be quite large for a large organization, and redetermining classifications for all of the customers in the database would prohibitively resource intensive. The techniques disclosed herein can be used to intelligently sample which customer records should be revisited for reclassification. The aim of the model in this example is to predict which customers will discontinue their subscriptions. The techniques disclosed herein can be used to decide which predictions to update using new training data. The predictions in this example are based on several criteria: (1) age—the amount of time that the customer has had a license or subscription; (2) seats—the number of licenses or subscriptions that the user has active; (3) subscription type—a text input that includes information identifying subscriptions by that customer. Input data 1010 includes data meeting theses criteria. The input data 1010 is used to train a first instance of the machine learning model 1015. A second instance of the machine learning model 1020 may also be trained using modified training data. The training data may be edited using a user interface similar to that user interface 200 illustrated in FIG. 2. The modifications to the training data may be made offline outside of the training data management application 605. The training data may be modified by manually editing training data in a text editor, in a database management tool, via scripts, or other means. The user interface 200 may include a means for loading such modified training data instead of or in addition to the interface described above for modifying the training data. The feature weights of the first instance of the model 1015 and the second instance of the model 1020 can be compared, similar to the text classifier example discussed above.

FIG. 11 illustrates an example user interface 1100 that is similar to the user interface 300 illustrated in FIG. 3. The user interface 1100 may be rendered on a display of the data processing system of the user by the training data management application 605. User interface 300 includes a table that lists feature weight changes resulting from the modifications made to the binary classifier training data in FIG. 10. The user interface 1100 may include a feature column 1110, an old model weights column 1115, an updated model weights column 1120, a delta column 1125, a delta column 1130, and a select entry column 1135. The value in the feature column 1110 represents the feature for which the weights have changed as a result of the changes to the training data. In the example illustrated in FIGS. 10-12, the model is a binary classifier, and the features are text strings. However, the techniques disclosed herein are not limited to text classifiers, and in other implementations, the features may be other types of data.

The columns are similar to those illustrated in user interface 300 of FIG. 3. The old model weights column 1115 illustrates what feature weight was assigned to the feature based on the original training data. The updated model weights 1120 column illustrates what the model weight for the feature would be if the training data were modified to include the changes made in FIG. 10. The delta column 1125 illustrates the difference between the updated model weight 1120 and the old model weight 1115. The delta magnitude column 1130 illustrates the absolute value of the delta value 1125. In the example illustrated in FIG. 11, the entries in the list are sorted based on the magnitude from largest to smallest. The greater the magnitude, the greater the change in the feature weight of that feature resulting from the modifications to the training data. The user interface 1100 may display the greatest magnitude changes higher in the list to provide users with a means for quickly identifying the impact of the changes to the model responsive to modifications to the training data for the machine learning model. The features having the highest magnitude changes are features that are mostly likely to be impacted by the changes to the training data. For example, in the binary classifier example discussed with regard to FIGS. 10-12, a feature having a higher magnitude change in feature weight in the modified model indicates that historical data that includes that feature is more likely to be reclassified to produce a different output (e.g. the subscriber is likely to discontinue their subscription vs. the subscriber is likely to continue their subscription) than data associated with features having a small magnitude change in feature weight. Therefore, historical data associated with these features should be selected for rescoring by the modified instance of the machine learning model to determine whether the behavior of the modified instance of the machine learning model is as expected.

The select entry column 1135 includes a checkbox that allows the user to select that entry for additional processing. In some implementations, the select entry column 1135 may be checked by default for magnitudes that are non-zero or over a predetermined threshold. The user may click on the generate report button 1140 to cause the application to determine, using the process described with respect to FIG. 12, a report illustrating changes to the model resulting from the changes to the training data. The user may select an entry for inclusion in the report by checking the checkbox corresponding to the entry in the column 1135 (if not already checked) or may exclude an entry from the report by unchecking the checkbox. The training data management application keeps track of which features were selected by the user on user interface 1100 for subsequent processing as discussed with respect to FIG. 12. The user may cancel the process by clicking on the cancel button 1145.

In some implementations, entries having over a threshold delta magnitude value may be selected by default. The threshold value may be configurable and may vary based on the type of machine learning model being fine-tuned using the application. The user may override the default value and select or deselected features to be processed further. Furthermore, in some implementations, all features having a delta magnitude greater than zero may be selected by default and the user may deselect features that they do not wish to include. The selected features may then be used to formulate a query for relevant historical data that may be scored by the modified instance of the machine learning model.

Figure 12:
FIG. 12 is a diagram illustrating a process for formulating a query to select relevant historical data to be rescored based on the changes to the machine learning model.

FIG. 12 is a diagram illustrating a process for formulating a query to select relevant historical data to be rescored based on the changes to the machine learning model. The process illustrated in FIG. 12 may performed by the training data management application 605. The process illustrated in FIG. 12 may begin with feature data being selected in user interface 1100 being used to formulate the query for relevant historical data. The data may be stored in a database, datastore, or other searchable means for storing the data. In the example illustrated in FIG. 12, the historical data is for a binary classifier, and is optimized searching the types of data included in the historical data to provide faster reporting of the impact of the selected changes to the training data. The type of storage and the structure and/or organization of the storage may be optimized for the type of machine learning model and the type of data utilized by that model.

In the example illustrated in FIG. 12, a SQL query is constructed that includes the features that were selected via user interface 1100 of FIG. 11. The number of records returned by the query may be limited by a configurable parameter. The user may modify the number of samples queried and the maximum number of historical records retrieved to suit the particular needs of the user. As discussed with respect to FIG. 4, users requiring faster results can select fewer features for which historical data will be located. The balance between speed and sample size depends upon the needs of the particular user. These techniques can significantly boost the analytical agility within the machine learning platform significantly.

The subset of the historical data selected by the query may be provided as an input to the modified instance of the machine learning model 1020. The modified instance of the machine learning model 1020 can score the historical data, and the output from the modified instance of the machine learning model can be compared to the output of the original instance of the machine learning model to identify changes to the behavior of the model. The output produced by original instance of the model may be stored in a database or other data store and be retrieved for comparison with the output of the modified instance of the machine learning model. In other implementations, the subset of the training data may be provided as an input to both the original instance of the machine learning model and the modified instance of the machine learning model to obtain the outputs of both instances. A user interface similar to that illustrated in FIG. 5 can be used to present the differences in the behavior of the original instance and the modified instance of the model to a user. While the example illustrated in FIG. 5 illustrate examples which samples were gained or lost by the class, the user interface 500 of FIG. 5 could instead display a report relevant to the binary classifier discussed in the examples of FIGS. 10-12. For example, the report could provide a listing of users from the historical data that are likely to discontinue their subscription under the first instance of the model 1015 but are likely to continue their subscriptions under the second instance of the model 1020. Similarly, the report may be configured to provide a listing of users that are likely to continue their subscription under the first instance of the model 1015 but are likely to discontinue their service under the second instance of the model 1020. The specific content rendered on the report and/or on user interface 500 of FIG. 5 may be customized for each type of machine learning model supported by the training data management application 605.

Figure 6:
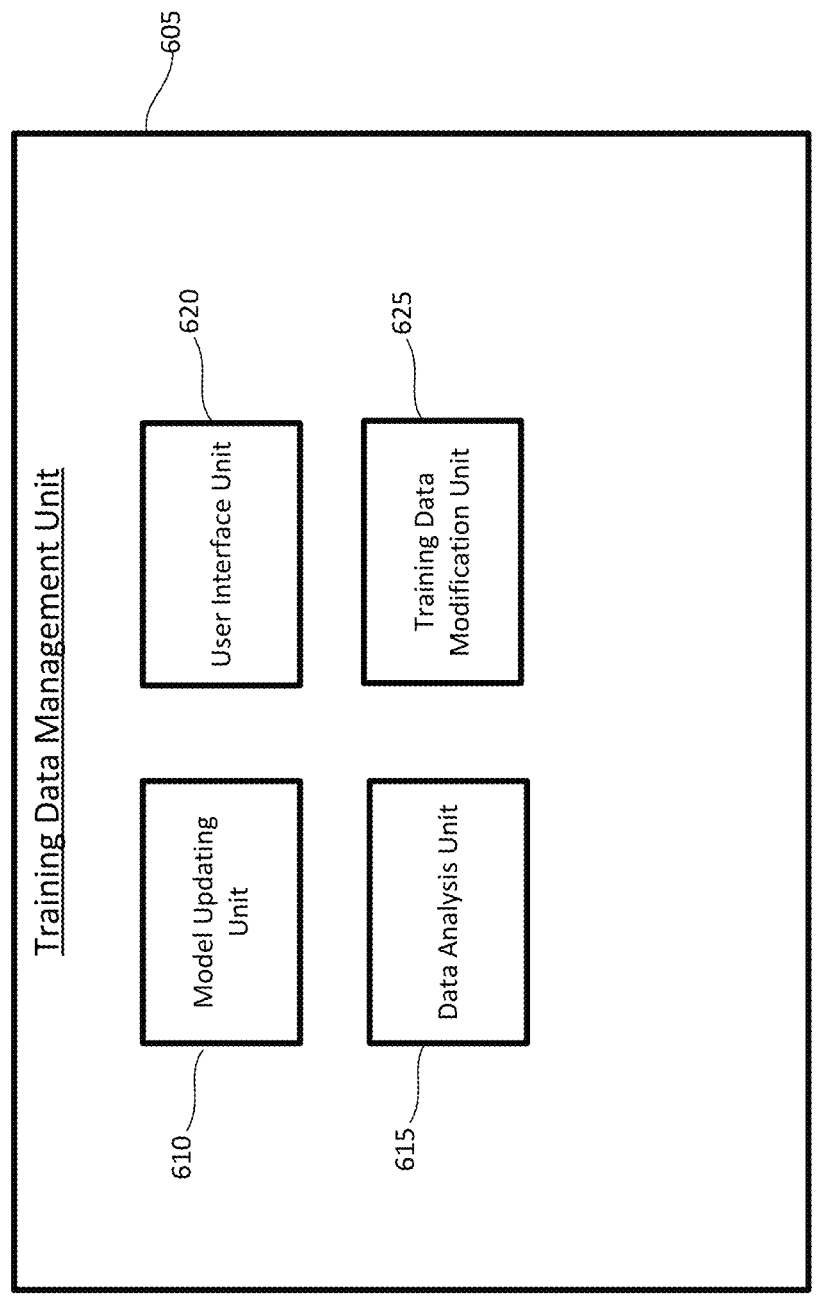
FIG. 6 is a diagram of an example training data management application that may be implemented by a data processing system to perform various operations for analyzing training data for a machine learning model.

FIG. 6 is a diagram of the function elements of an example training data management application 605. The training data management application 605 may be configured to perform various operations described in the preceding examples related to modifying training data and analyzing how those changes image the machine learning model. The training data management application 605 can be implemented by processor-executable program code, hardware, or a combination thereof, and may be implemented by the example software architecture 800 of FIG. 8 and/or the example computing device 900 illustrated in FIG. 9. The training data management application 605 may include a model updating unit 610, a data analysis unit 615, a user interface unit 620, and a training data modification unit 625, and configuration unit 635.

The model updating unit 610 may be configured to receive input from a user identifying changes to the training data used to train instances of a machine learning model. The model updating unit 610 may train an instance of the machine learning model using the modified training data set and compare the internal parameters of an original instance of the model and an instance of the modified model as discussed in the preceding examples.

The data analysis unit 615 may analyze the changes to the training data set to determine how those changes would impact the output of the machine learning model trained using that training dataset as illustrated in the previous examples. The data analysis unit 615 may receive proposed changes to the training data set from the model updating unit 610 and analyze those changes to present a user with a report on the impact that those changes would have on the machine learning model.

The user interface unit 620 may provide a user interface, such as but not limited to the user interface 200, that may be rendered on a display of a data processing system. The user interface may provide a means for the user to select a set of training data to be modified and analyzed by the training data management application 605. The user interface may also provide a means for rendering the contents on a display of the data processing system to allow the user to browse through and/or edit the training data. The user interface may also provide means for rendering the results of the analysis of the modified training data to highlight changes between the outputs that would be produced by an original instance of the machine learning model trained by an unmodified set of training data and the output of an instance of the model trained on the modified set of training data.

The training data modification unit 625 may permit the user to save changes to the training data that the user has editing via the user interface 200 provided by the user interface unit 620. The training data modification unit 625 may receive edits to the training data via the user interface 200 and provide those edits to the training data modification unit 625. The training data modification unit 625 may then save those changes to a copy of the training data stored in a memory of the computing device. The stored training data may be used to train a machine learning model.

The configuration unit 635 may be configured to allow the user to configure various parameters associated with the techniques disclosed herein. For example, the configuration unit 635 may be configured to provide an interface through which a user may set a default value for the number of records of historical data that are retrieved to be rescored in the operations described in FIG. 4. The configuration unit 635 may also be configured to provide an interface through which the user may set a default change in magnitude value to be used in the user interface 300 illustrated in FIG. 3.

Figure 7:
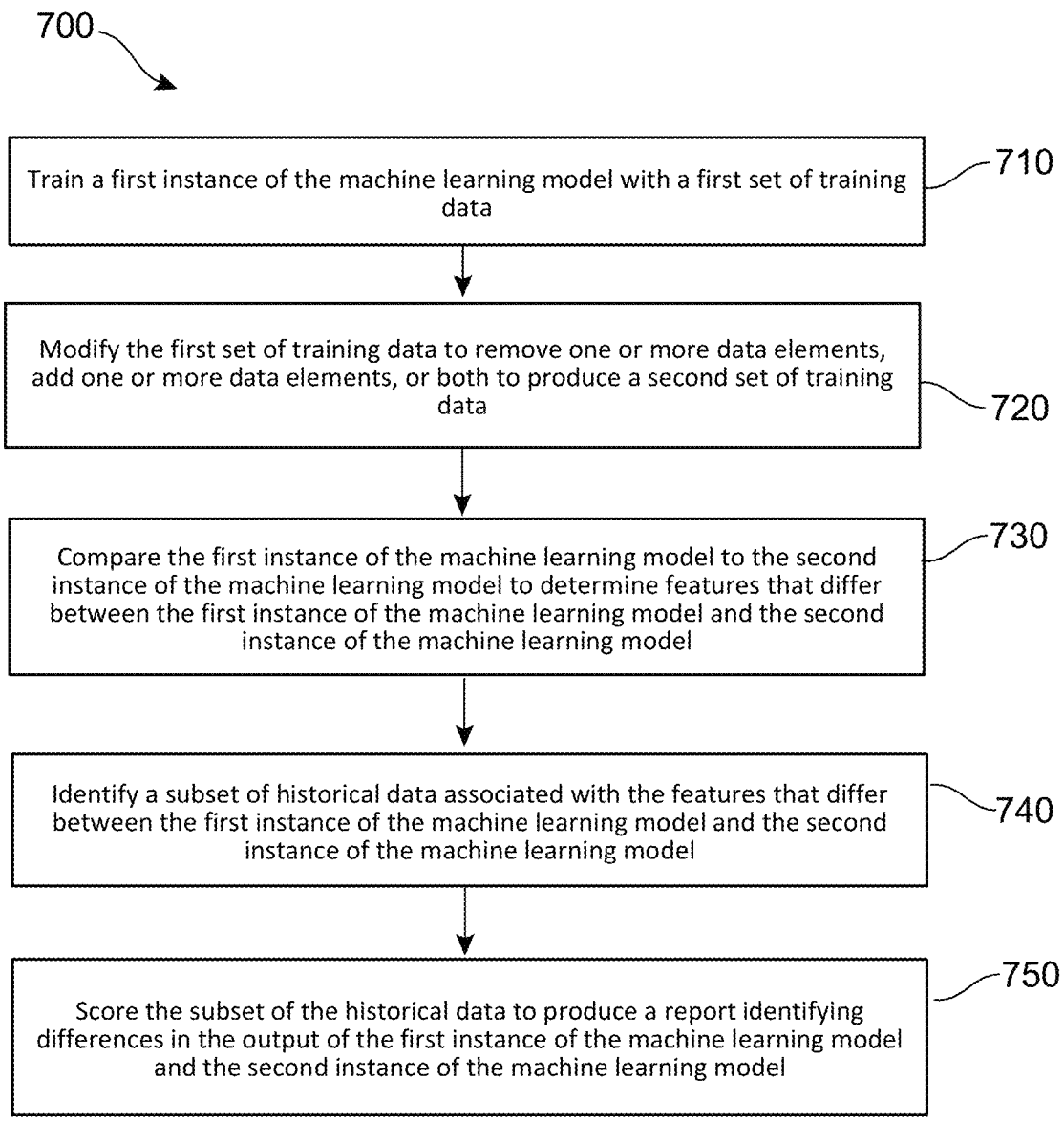
FIG. 7 is a flow chart illustrating an implementation of an example process executed by a data processing system for evaluating training data changes on a machine learning model.

FIG. 7 is a flow chart illustrating an implementation of an example process 900 executed by a data processing system for evaluating training data changes on a machine learning model. The process 700 may be implemented by the training data management application 605 in the preceding examples. The process 700 may be implemented by a data processing system similar to the data processing system 900 of FIG. 9.

The process 700 may include an operation 710 of training a first instance of the machine learning model with a first set of training data. A machine learning model may be trained with a first set of training data. The training data may in some implementations be a subset of historical data that is used is scored by the machine learning model to assess whether the model is behaving as expected. In some implementations, the machine learning model may be an OVR model that includes a single classifier per class. The training data for an OVR model includes one or more positive samples and one or more negative samples for each class. The specific content of the training data is dependent on the type of machine learning model being developed. The techniques disclosed herein are not limited to a specific type of machine learning model.

The process 700 may include an operation 720 of modifying the first set of training data to remove one or more data elements, add one or more data elements, or both to produce a second set of training data. The user may add or remove training data to modify the behavior of the machine learning model. The user interface 200 illustrates one example of a means for modifying the training data for used to train the machine learning model.

The process 700 may include an operation 730 of training a second instance of the machine learning model with the second set of training data. The training data modified in operation 720 can be used to train a second instance of the machine learning model. The second instance of the model may be trained using the same techniques that were used to train the original instance of the model.

The process 700 may include an operation 740 of comparing the first instance of the machine learning model to the second instance of the machine learning model to determine features that differ between the first instance of the machine learning model and the second instance of the machine learning model. The internal coefficients, feature weights, or other internal parameters of the second instance of the machine learning model may differ from those of the first instance of the model trained on the original set of training data. The changes in these internal parameters provide information that can be used to determine how the output of the modified model may differ from that of the original instance of the machine learning model. The user interface illustrated in FIG. 3 illustrates an example in which feature weight changes for a text classifier are compared for the original instance of the model and the modified instance of the model to identify changes that may impact the output of the model. The higher the magnitude of the differences between these internal parameters of the original instance of the model and the modified instance of the model the more likely that these changes may impact the output of the machine learning model.

The process 700 may include an operation 750 of identifying a subset of historical data associated with the features that differ between the first instance of the machine learning model and the second instance of the machine learning model. The subset of historical data is selected based on the features that changed due responsive to the modifications made to the training data. Thus, the subset of historical data is most likely to be relevant for evaluating the impact that the changes to the training data had on the machine learning model. As indicated in the preceding examples, the user may select which features to include in the search for historical data. Alternatively, the features for which historical data is identified may be selected automatically based on a magnitude of the differences of the internal parameters associated with that feature in the original instance of the machine learning model and the updated instance of the model.

The historical data may be stored in a database or other searchable data structures, and a query may be formulated based on the features that were modified to select the historical data from the corpus of historical data that would typically be scored by the machine learning model to evaluate changes to the model. The query may be formulated using operations similar to those discussed in the preceding examples.

The process 700 may include an operation 760 of scoring the subset of the historical data to produce a report identifying differences in the output of the first instance of the machine learning model and the second instance of the machine learning model. Limiting the historical data to historical data that has been filtered on features that may be most impacted by the changes to the training data, a user can quickly rescore the data using the retrained model without having to wait for the entire corpus of historical data to be scored by the modified model. Furthermore, as discussed in the preceding examples, the user can customize certain parameters that control how much historical data may be selected for scoring using the modified machine learning model to assess how the changes to the training data will impact the model. The user may determine that the changes to the training data did not produce the desired output by the machine learning model and may further revise the training data used to train the model. If the changes to the training data are suitable, the user may score the entire set of data with the modified model to determine whether there are any unanticipated effects that did not appear in the subset of historical data scored by the modified model.

The techniques for fine-tuning machine learning models discussed above provide a significant improvement over conventional approaches that require a significant investment in time and processing power to score the extensive amount of historical data used to validate the behavior of the model. The techniques disclosed herein can be used to quickly evaluate whether changes to training data for a machine learning model provide expected behavior by selectively scoring relevant historical data to evaluate the behavior of the modified instance of the machine learning model.

The detailed examples of systems, devices, and techniques described in connection with FIGS. 1-7 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-7 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 8:
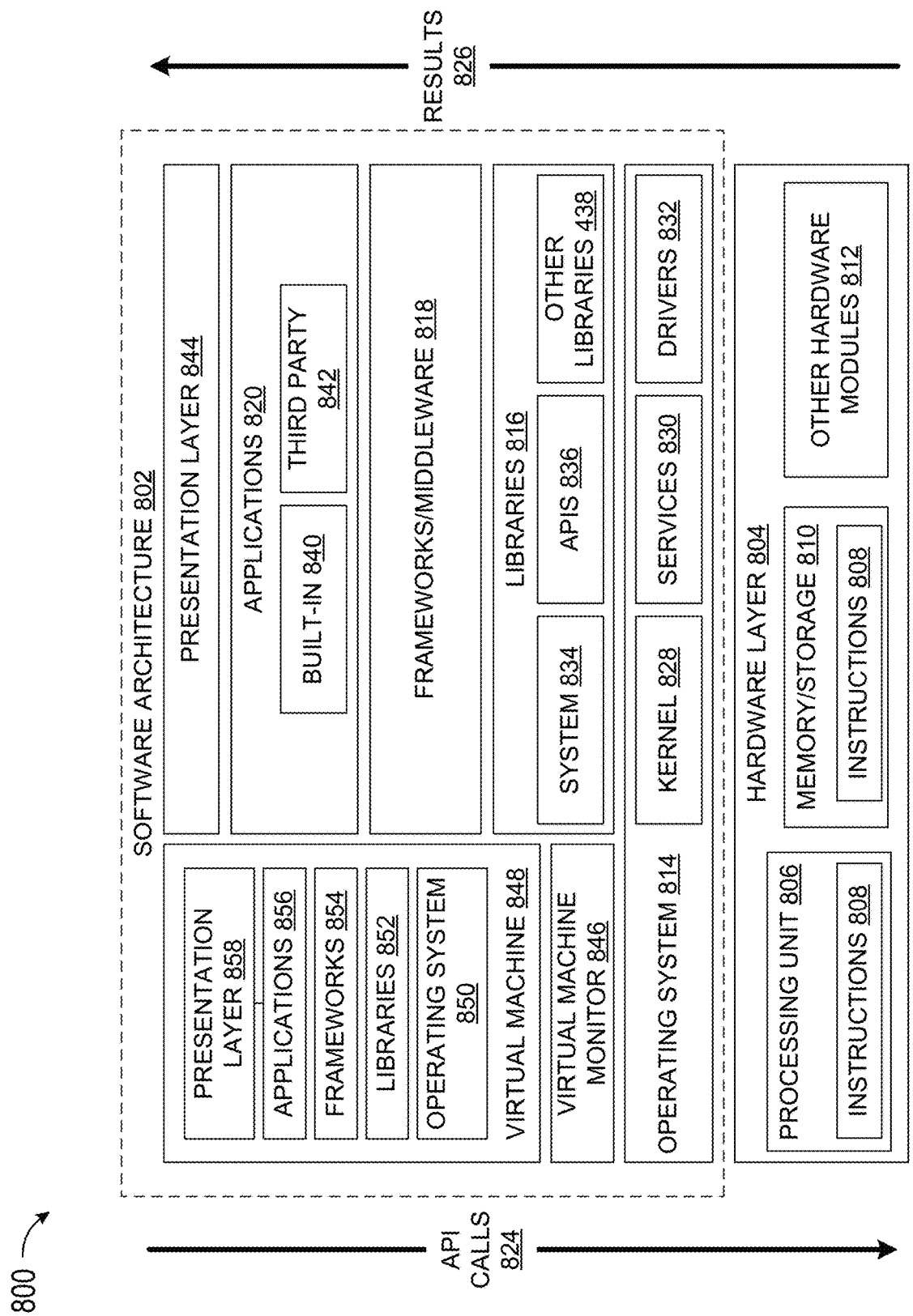
FIG. 8 is a block diagram illustrating an example software architecture, various portions of which may be used in conjunction with various hardware architectures herein described, which may implement any of the features herein described.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as a machine 900 of FIG. 9 that includes, among other things, processors 98, memory 930, and input/output (I/O) components 950. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 808 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 814, libraries 872, frameworks 854, applications 856, and/or a presentation layer 858.

Figure 9:
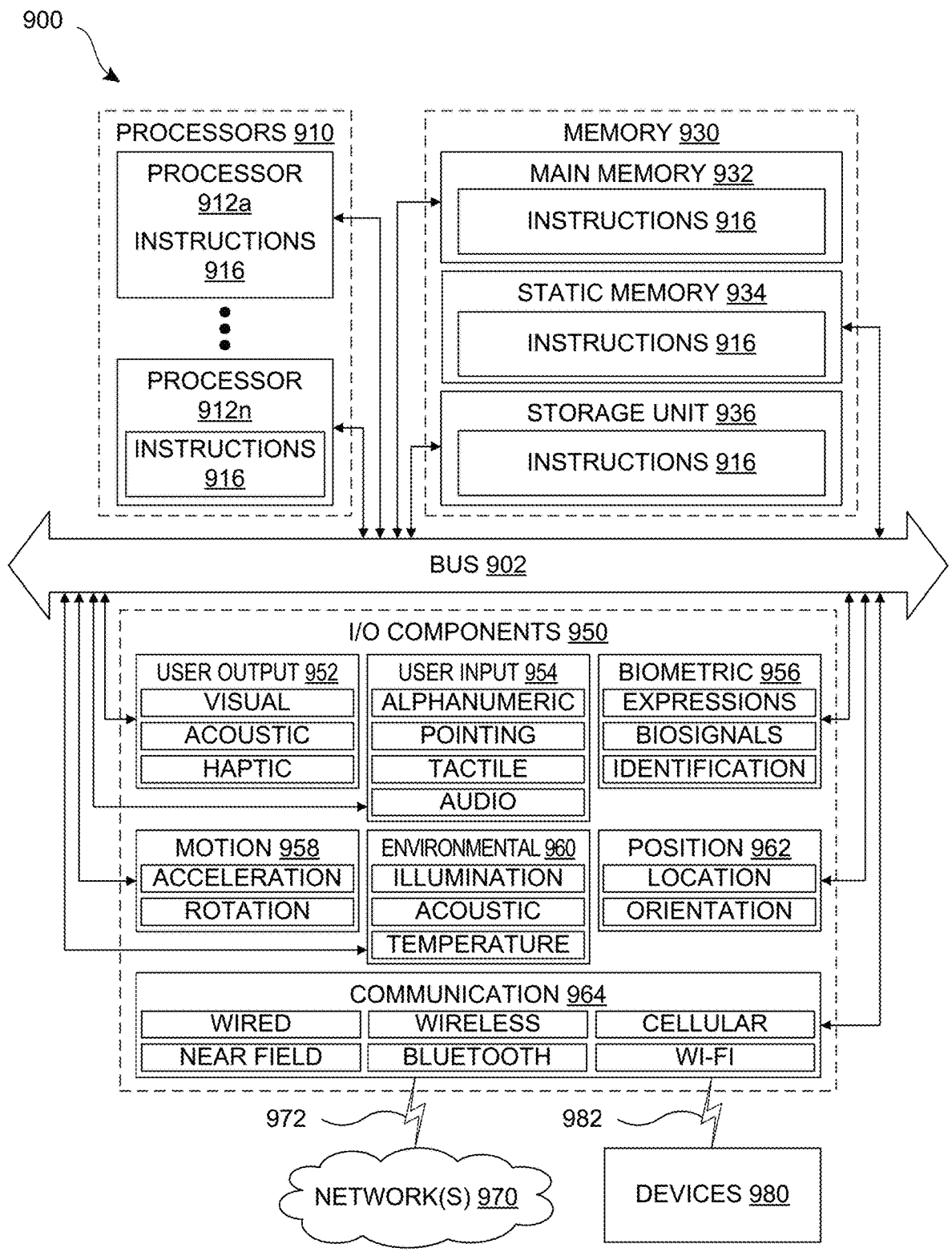
FIG. 9 is a block diagram illustrating components of an example machine configured to read instructions from a machine-readable medium and perform any of the features described herein.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

In the following, further features, characteristics and advantages of the system and method will be described by means of items: Item 1. A data processing system comprising: a processor; and a computer-readable medium. The computer-readable medium storing executable instructions for causing the processor to perform operations comprising: training a first instance of a machine learning model with a first set of training data; modifying the first set of training data to remove one or more data elements, add one or more data elements, or both to produce a second set of training data; training a second instance of the machine learning model with the second set of training data; comparing the first instance of the machine learning model to the second instance of the machine learning model to determine features that differ between the first instance of the machine learning model and the second instance of the machine learning model; identifying a subset of historical data associated with the features that differ between the first instance of the machine learning model and the second instance of the machine learning model; and scoring the subset of the historical data to produce a report identifying differences in the output of the first instance of the machine learning model and the second instance of the machine learning model.

Item 2. The data processing system of item 1, wherein the first instance of the machine learning model and the second instance of the machine learning model are text classifiers.

Item 3. The data processing system of item 2, wherein the first instance of the machine learning model and the second instance of the machine learning model are one-vs.-rest (OVR) text classifiers.

Item 4. The data processing system of item 1, further including instructions for causing the processor to perform operations comprising: rendering, on a display of the data processing system, a list of features from the subset of historical data for which a classification of the features differs between the first instance of the machine learning model and the second instance of the machine learning model.

Item 5. The data processing system of item 1, wherein the instructions to compare the first instance of the machine learning model to the second instance of the machine learning model include instructions for causing the processor to perform operations comprising: comparing feature weights associated with the first instance of the machine learning model and the second instance of the machine learning model to identify feature weights that are differ between the first instance of the machine learning model and the second instance of the machine learning model.

Item 6. The data processing system of item 5, further including instructions for causing the processor to perform operations comprising: rendering a list of features on a display of the data processing system that includes features for which the feature weights differ between the first instance of the machine learning model and the second instance of the machine learning model and a magnitude of a difference between the feature weights for each of the features.

Item 7. The data processing system of item 1, wherein the instructions to identify the subset of the historical data associated with the features that differ between the first instance of the machine learning model and the second instance of the machine learning model include instructions for causing the processor to perform operations comprising: constructing a query based for at least a subset of the features for which the features weights differ between the first instance of the machine learning model and the second instance of the machine learning model.

Item 8. The data processing system of item 7, wherein the instructions to construct the query include instructions for causing the processor to perform operations comprising: constructing the query to select historical data for features for which the magnitude of a difference between the respective feature weights of that feature in the first model and second model differ by more than a threshold magnitude.

Item 9. A method for system for evaluating training data changes on a machine learning model, the method comprising: training a first instance of the machine learning model with a first set of training data; modifying the first set of training data to remove one or more data elements, add one or more data elements, or both to produce a second set of training data; training a second instance of the machine learning model with the second set of training data; comparing the first instance of the machine learning model to the second instance of the machine learning model to determine features that differ between the first instance of the machine learning model and the second instance of the machine learning model; identifying a subset of historical data associated with the features that differ between the first instance of the machine learning model and the second instance of the machine learning model; and scoring the subset of the historical data to produce a report identifying differences in the output of the first instance of the machine learning model and the second instance of the machine learning model.

Item 10. The method of item 9, wherein the first instance of the machine learning model and the second instance of the machine learning model are one-vs.-rest (OVR) text classifiers.

Item 11. The method of item 9, further comprising: rendering, on a display of the data processing system, a list of features from the subset of historical data for which a classification of the features differs between the first instance of the machine learning model and the second instance of the machine learning model.

Item 12. The method of item 9, wherein comparing the first instance of the machine learning model to the second instance of the machine learning model comprises: comparing feature weights associated with the first instance of the machine learning model and the second instance of the machine learning model to identify feature weights that are differ between the first instance of the machine learning model and the second instance of the machine learning model.

Item 13. The method of item 12, further comprising: rendering a list of features on a display of the data processing system that includes features for which the feature weights differ between the first instance of the machine learning model and the second instance of the machine learning model and a magnitude of a difference between the feature weights for each of the features.

Item 14. The method of item 9, wherein identifying the subset of the historical data associated with the features that differ between the first instance of the machine learning model and the second instance of the machine learning model further comprises: constructing a query based for at least a subset of the features for which the features weights differ between the first instance of the machine learning model and the second instance of the machine learning model.

Item 15. The method of item 14, wherein constructing the query further comprises: constructing the query to select historical data for features for which the magnitude of a difference between the respective feature weights of that feature in the first model and second model differ by more than a threshold magnitude.

Item 16. A memory device storing instructions that, when executed on a processor of a data processing system, cause the data processing system to evaluating training data changes on a machine learning model, by: training a first instance of the machine learning model with a first set of training data; modifying the first set of training data to remove one or more data elements, add one or more data elements, or both to produce a second set of training data; training a second instance of the machine learning model with the second set of training data; comparing the first instance of the machine learning model to the second instance of the machine learning model to determine features that differ between the first instance of the machine learning model and the second instance of the machine learning model; identifying a subset of historical data associated with the features that differ between the first instance of the machine learning model and the second instance of the machine learning model; and scoring the subset of the historical data to produce a report identifying differences in the output of the first instance of the machine learning model and the second instance of the machine learning model.

Item 17. The memory device of item 16, wherein the instructions to compare the first instance of the machine learning model to the second instance of the machine learning model include instructions for causing the processor to perform operations comprising: comparing feature weights associated with the first instance of the machine learning model and the second instance of the machine learning model to identify feature weights that are differ between the first instance of the machine learning model and the second instance of the machine learning model.

Item 18. The method of item 17, further including instructions for causing the processor to perform operations comprising: rendering a list of features on a display of the data processing system that includes features for which the feature weights differ between the first instance of the machine learning model and the second instance of the machine learning model and a magnitude of a difference between the feature weights for each of the features.

Item 19. The method of item 16, wherein the instructions to identify the subset of the historical data associated with the features that differ between the first instance of the machine learning model and the second instance of the machine learning model include instructions for causing the processor to perform operations comprising: constructing a query based for at least a subset of the features for which the features weights differ between the first instance of the machine learning model and the second instance of the machine learning model.

Item 20. The method of item 14, wherein the instructions to construct the query include instructions for causing the processor to perform operations comprising: constructing the query to select historical data for features for which the magnitude of a difference between the respective feature weights of that feature in the first model and second model differ by more than a threshold magnitude.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a computer-readable medium storing executable instructions for causing the processor to perform operations comprising:
training a first instance of a machine learning model with a first set of training data;
modifying the first set of training data to remove one or more data elements, add one or more data elements, or both to produce a second set of training data;
training a second instance of the machine learning model with the second set of training data;
comparing the first instance of the machine learning model to the second instance of the machine learning model to determine features that differ between the first instance of the machine learning model and the second instance of the machine learning model;
identifying a subset of historical data associated with the features that differ between the first instance of the machine learning model and the second instance of the machine learning model; and
scoring the subset of the historical data to produce a report identifying differences in an output of the first instance of the machine learning model and the second instance of the machine learning model.

2. The data processing system of claim 1, wherein the first instance of the machine learning model and the second instance of the machine learning model are text classifiers.

3. The data processing system of claim 2, wherein the first instance of the machine learning model and the second instance of the machine learning model are one-vs.-rest (OVR) text classifiers.

4. The data processing system of claim 1, further including instructions for causing the processor to perform operations comprising:
rendering, on a display of the data processing system, a list of features from the subset of historical data for which a classification of the features differs between the first instance of the machine learning model and the second instance of the machine learning model.

5. The data processing system of claim 1, wherein the instructions to compare the first instance of the machine learning model to the second instance of the machine learning model include instructions for causing the processor to perform operations comprising:
comparing feature weights associated with the first instance of the machine learning model and the second instance of the machine learning model to identify feature weights that differ between the first instance of the machine learning model and the second instance of the machine learning model.

6. The data processing system of claim 5, further including instructions for causing the processor to perform operations comprising:
rendering a list of features on a display of the data processing system that includes features for which the feature weights differ between the first instance of the machine learning model and the second instance of the machine learning model and a magnitude of a difference between the feature weights for each of the features.

7. The data processing system of claim 1, wherein the instructions to identify the subset of the historical data associated with the features that differ between the first instance of the machine learning model and the second instance of the machine learning model include instructions for causing the processor to perform operations comprising:

constructing a query based for at least a subset of the features for which feature weights differ between the first instance of the machine learning model and the second instance of the machine learning model.

8. The data processing system of claim 7, wherein the instructions to construct the query include instructions for causing the processor to perform operations comprising:

constructing the query to select historical data for features for which the magnitude of a difference between respective feature weights of that feature in the first model and second model differ by more than a threshold magnitude.

9. A method for evaluating training data changes on a machine learning model, the method comprising:

training a first instance of the machine learning model with a first set of training data;

modifying the first set of training data to remove one or more data elements, add one or more data elements, or both to produce a second set of training data;

training a second instance of the machine learning model with the second set of training data;

comparing the first instance of the machine learning model to the second instance of the machine learning model to determine features that differ between the first instance of the machine learning model and the second instance of the machine learning model;

identifying a subset of historical data associated with the features that differ between the first instance of the machine learning model and the second instance of the machine learning model; and scoring the subset of the historical data to produce a report identifying differences in an output of the first instance of the machine learning model and the second instance of the machine learning model.

10. The method of claim 9, wherein the first instance of the machine learning model and the second instance of the machine learning model are one-vs.-rest (OVR) text classifiers.

11. The method of claim 9, further comprising:

rendering, on a display of a data processing system, a list of features from the subset of historical data for which a classification of the features differs between the first instance of the machine learning model and the second instance of the machine learning model.

12. The method of claim 9, wherein comparing the first instance of the machine learning model to the second instance of the machine learning model comprises:

comparing feature weights associated with the first instance of the machine learning model and the second instance of the machine learning model to identify feature weights that differ between the first instance of the machine learning model and the second instance of the machine learning model.

13. The method of claim 12, further comprising:

rendering a list of features on a display of a data processing system that includes features for which the feature weights differ between the first instance of the machine learning model and the second instance of the machine learning model and a magnitude of a difference between the feature weights for each of the features.

14. The method of claim 9, wherein identifying the subset of the historical data associated with the features that differ between the first instance of the machine learning model and the second instance of the machine learning model further comprises:

constructing a query based for at least a subset of the features for which feature weights differ between the first instance of the machine learning model and the second instance of the machine learning model.

15. The method of claim 14, wherein constructing the query further comprises:

constructing the query to select historical data for features for which a magnitude of a difference between respective feature weights of that feature in the first model and second model differ by more than a threshold magnitude.

16. A memory device storing instructions that, when executed on a processor of a data processing system, cause the data processing system to evaluate training data changes on a machine learning model, by:

training a first instance of the machine learning model with a first set of training data;

modifying the first set of training data to remove one or more data elements, add one or more data elements, or both to produce a second set of training data;

training a second instance of the machine learning model with the second set of training data;

comparing the first instance of the machine learning model to the second instance of the machine learning model to determine features that differ between the first instance of the machine learning model and the second instance of the machine learning model;

identifying a subset of historical data associated with the features that differ between the first instance of the machine learning model and the second instance of the machine learning model; and scoring the subset of the historical data to produce a report identifying differences in the output of the first instance of the machine learning model and the second instance of the machine learning model.

17. The memory device of claim 16, wherein comparing the first instance of the machine learning model to the second instance of the machine learning model further comprises:

comparing feature weights associated with the first instance of the machine learning model and the second instance of the machine learning model to identify feature weights that differ between the first instance of the machine learning model and the second instance of the machine learning model.

18. The memory device of claim 17, further including instructions for causing the processor to perform operations comprising:

rendering a list of features on a display of the data processing system that includes features for which the feature weights differ between the first instance of the machine learning model and the second instance of the machine learning model and a magnitude of a difference between the feature weights for each of the features.

19. The memory device of claim 16, wherein identifying the subset of the historical data associated with the features that differ between the first instance of the machine learning model and the second instance of the machine learning model further comprises:

constructing a query based for at least a subset of the features for which features weights differ between the first instance of the machine learning model and the second instance of the machine learning model.

20. The memory device of claim 19, wherein constructing the query further comprises:
   constructing the query to select historical data for features for which a magnitude of a difference between respective feature weights of that feature in the first model and second model differ by more than a threshold magnitude.

* * * * *